United States Patent
O'Brien (10) Patent No.: US 11,121,857 B2
(45) Date of Patent: Sep. 14, 2021

(54) SYSTEMS, DEVICES, AND METHODS FOR IN-FIELD AUTHENTICATING OF AUTONOMOUS ROBOTS

(71) Applicant: Walmart Apollo, LLC, Bentonville, AR (US)

(72) Inventor: John Jeremiah O'Brien, Farmington, AR (US)

(73) Assignee: Walmart Apollo, LLC, Bentonville, AR (US)

(*) Notice: Subject to any disclaimer, the term of this patent is extended or adjusted under 35 U.S.C. 154(b) by 245 days.

(21) Appl. No.: 15/877,514

(22) Filed: Jan. 23, 2018

(65) Prior Publication Data

US 2018/0248685 A1 Aug. 30, 2018

Related U.S. Application Data (60) Provisional application No. 62/463,869, filed on Feb. 27, 2017.

(51) Int. Cl.
*H04L 29/06* (2006.01)
*H04L 9/06* (2006.01)
(Continued)

(52) U.S. Cl.
CPC .......... *H04L 9/0637* (2013.01); *H04L 9/3236* (2013.01); *H04L 9/3297* (2013.01);
(Continued)

(58) Field of Classification Search
CPC ... H04L 9/0637; H04L 9/3236; H04L 9/3297; H04L 63/0876; H04L 63/0853;
(Continued)

(56) References Cited

U.S. PATENT DOCUMENTS

| 9,211,025 B1 | 12/2015 | Elhawwashy |
| 9,359,074 B2 | 6/2016 | Ganesh et al. |

(Continued)

FOREIGN PATENT DOCUMENTS

WO WO2018035578 * 8/2016 ............... B64D 1/08

OTHER PUBLICATIONS

Yu, Eileen, SingPost test drives drone delivery, but no firm commercial plans, By The Way, http://www.zdnet.com/article/singpost testdrivesdronedeliverybutnofirmcommercialplans/, Oct. 8, 2015.

(Continued)

*Primary Examiner* — Taghi T Arani
*Assistant Examiner* — Lin Chang
(74) *Attorney, Agent, or Firm* — Fitch, Even, Tabin & Flannery LLP (57) ABSTRACT

Methodologies, systems, and computer-readable media are provided for in-field authentication of autonomous electronic devices. A first mobile autonomous electronic device wirelessly communicates with a second mobile autonomous electronic device and receives a set of identification information associated with the second mobile autonomous electronic device. The first electronic device autonomously travels to a specified location and transmits a first authentication signal to the second electronic device upon arrival at the specified location. The second electronic device confirms the identity of the first electronic device based on the first authentication signal and transmits a second authentication signal to the first electronic device. Once the first electronic device has confirmed that the identity of the second electronic device corresponds to an expected identity, the first electronic device transfers the object to the second electronic device.

14 Claims, 8 Drawing Sheets

(51) Int. Cl.
*H04W 12/06* (2021.01)
*H04W 4/46* (2018.01)
*H04L 9/32* (2006.01)

(52) U.S. Cl.
CPC ...... *H04L 63/0853* (2013.01); *H04L 63/0876* (2013.01); *H04W 4/46* (2018.02); *H04W 12/06* (2013.01); *B64C 2201/128* (2013.01); *B64C 2201/141* (2013.01); *H04L 2209/38* (2013.01)

(58) Field of Classification Search
CPC .... H04L 2209/38; H04W 12/06; H04W 4/46; B64C 2201/141; B64C 2201/128
See application file for complete search history.

(56) References Cited

U.S. PATENT DOCUMENTS

| | | | |
|---|---|---|---|
| 9,661,477 B1* | 5/2017 | Ebrahimi Afrouzi ... | H04W 4/08 |
| 2004/0024490 A1 | 2/2004 | McLurkin et al. | |
| 2007/0152619 A1 | 7/2007 | Sugiyama et al. | |
| 2012/0215380 A1 | 8/2012 | Fouillade et al. | |
| 2014/0254896 A1 | 9/2014 | Zhou et al. | |
| 2015/0120015 A1 | 4/2015 | Fadell et al. | |
| 2015/0379796 A1 | 12/2015 | Glasgow et al. | |
| 2016/0033966 A1* | 2/2016 | Farris ................ | A47G 29/141 |
| | | | 701/15 |
| 2016/0182500 A1* | 6/2016 | Ligatti ............... | H04L 9/3271 |
| | | | 713/156 |
| 2016/0235236 A1* | 8/2016 | Byers ................. | A47G 29/141 |
| 2016/0342934 A1* | 11/2016 | Michalik ............ | B64C 39/024 |
| 2017/0011333 A1* | 1/2017 | Greiner .............. | G06Q 10/083 |
| 2017/0039510 A1* | 2/2017 | Ogilvie .............. | G07F 17/12 |
| 2018/0239343 A1 | 8/2018 | Voorhies ............ | G05D 1/0234 |
| 2018/0264347 A1* | 9/2018 | Tran ................... | A63B 71/145 |

OTHER PUBLICATIONS

Phillips, Alan, Yopur Drone Mailbox is Coming, jobfordrones.com, http://dronelife.com/2014/05/28/dronemailboxcoming/, May 28, 2014.
International Search Report and Written Opinion from related international patent application serial No. PCT/US2018/014822 dated Mar. 29, 2018.

* cited by examiner

SYSTEMS, DEVICES, AND METHODS FOR IN-FIELD AUTHENTICATING OF AUTONOMOUS ROBOTS

CROSS-REFERENCED APPLICATIONS

This application claims priority to U.S. Provisional Patent Application Ser. No. 62/463,869, entitled "SYSTEMS, DEVICES, AND METHODS FOR IN-FIELD AUTHENTICATING OF AUTONOMOUS ROBOTS," filed on Feb. 27, 2017, which is hereby incorporated by reference in its entirety.

BACKGROUND

Various types of objects can be relocated and delivered to different locations. Relocating such objects can sometimes be accomplished using automated vehicles.

SUMMARY

In one example embodiment, a system for in-field authentication of autonomous electronic devices includes a first mobile autonomous electronic device configured to deliver an object to a specified location. The first mobile autonomous electronic device is configured to wirelessly communicate with a second mobile autonomous electronic device responsible for receiving the object at the specified location. The first mobile autonomous electronic device is configured to receive a set of identification information associated with the second mobile autonomous electronic device and to autonomously travel to the specified location. The first mobile autonomous electronic device is also configured to transmit a first authentication signal to the second mobile autonomous electronic device upon arrival at the specified location, and the second mobile autonomous electronic device is configured to confirm an identity of the first mobile autonomous electronic device based on the first authentication signal. The first mobile autonomous electronic device is also configured to receive a second authentication signal from the second mobile autonomous electronic device in response to transmission of the first authentication signal, and to confirm an identity of the second mobile autonomous electronic device based on the second authentication signal. Once the first mobile autonomous electronic device has confirmed that the identity of the second mobile autonomous electronic device corresponds to an expected identity, the first mobile autonomous electronic device transfers the object to the second mobile autonomous electronic device.

Additional combinations and/or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present invention will be more fully understood from the following description of exemplary embodiments when read together with the accompanying drawings, in which.

DETAILED DESCRIPTION

Following below are more detailed descriptions of various concepts related to, and embodiments of, inventive methods, apparatus, and systems for in-field authentication of autonomous electronic devices. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means "includes but is not limited to", the term "including" means "including but not limited to". The term "based on" means "based at least in part on".

As autonomous technologies become more affordable and available for use, some individuals may wish to delegate certain tasks or activities to autonomous electronic devices. This can result in several issues including the increased likelihood of security breaches, e.g., via interception or hacking of the autonomous electronic devices. As one example, in accordance with exemplary embodiments users can have objects or packages delivered to autonomous vehicle surrogates or drones. This raises challenges related to security and authentication of both the autonomous device delivering the object and the autonomous device receiving the object when objects are being delivered. It is thus necessary to create a medium for autonomous vehicles to authenticate each other; which allows for the security and authentication of the autonomous electronic devices.

Methodologies, systems, apparatus, and non-transitory computer-readable media are described herein to facilitate in-field authentication of autonomous electronic devices. In exemplary embodiments, two autonomous electronic devices, such as delivery drones or household autonomous robots, can authenticate each other using embodiments of security procedures described herein. This can safeguard packages, customers, and the autonomous electronic devices themselves. In some embodiments, each of the autonomous electronic devices used for delivery and receipt of objects can be unique in the features and technologies integrated therein. Therefore, exemplary embodiments can implement an authentication medium for such devices that is flexible to handle multiple types of devices and platforms. For example, some devices may only use RFID technology, whereas others may use robotic licenses and signatures, and still others may use optical or light based technologies (e.g., infrared communication) or pressure wave technologies (such audio or sound waves).

In exemplary embodiments, the autonomous electronic devices can be drones or other robotic devices configured with onboard computing systems and processors. The autonomous electronic devices can be in communication with a remote server or processor. The autonomous electronic devices can also include integrated receivers and transmitters for sending and receiving identification information and authentication signals, in some embodiments. Examples of technologies that can be used for sending and receiving identification information and authentication signals include wireless intrusion prevention system (WIPS) technology, RFID, NFC, ultra-wideband, Wi-Fi, Bluetooth, infrared, sound, etc.

In exemplary embodiments, a first mobile autonomous electronic device can be configured to deliver an object to a second autonomous electronic device located at a delivery location. The second autonomous electronic device can be a mobile autonomous electronic device or a stationary autonomous electronic device. Each of the first and second autonomous electronic devices can communicate over a wireless communication channel to transmit and receive the necessary authentication signals in order to guarantee that the delivery is being made to the correct autonomous electronic device by the correct autonomous device. In exemplary embodiments, the recipient of the package can view or track the progress of the delivery through a first computing device. In some embodiments, the sender of the object can also track the status of the delivery using a second computing device. Once the authentication process has been completed, the first mobile autonomous electronic device can handoff or pass the object to the second autonomous electronic device, and all information associated with the handoff and completion of the delivery from the first mobile autonomous electronic device and the second autonomous electronic device can be transmitted and stored at a remote database, such as a cloud database. In exemplary embodiments, the sender and receiver can both be notified that the delivery has been completed, and a delivery notification and confirmation can be stored in their respective computing devices.

In exemplary embodiments, the autonomous electronic devices can be authenticated through a multi-layered authentication medium, which requires authentication of two or more types of identification information. The different types of authentication information can include, for example, audio or voice signatures, robotic sounds or voices, humanoid voices or sounds integrated into the electronic devices, RFID signals, IP-IP via Wi-Fi, Ultra-Wideband signals, WINS or WIPS signals, infrared communication, a robotic license number, a humanoid delivery signature, a robotic signature, a delivery license, a visual characteristic of the mobile autonomous electronic device such as make, model, or color, etc. In exemplary embodiments, a multi-layered authentication medium can require the first and second autonomous electronic devices to pass each authentication medium, or a specific number of media, or a random selection of media, in order to complete delivery. The specific authentication information required for each delivery can be determined by the delivery device, or by a separate smart device associated with the sender or receiver or an online account associated with the sender or receiver.

In exemplary embodiments, an authentication between two autonomous electronic devices can be facilitated through a smart device associated with the receiver. For example, an authentication signal or code can be sent to the smart device associated with the recipient from the autonomous electronic device configured to deliver an object. The smart device can then transmit the authentication signal to the autonomous electronic device that should receive the object.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

Figure 1:
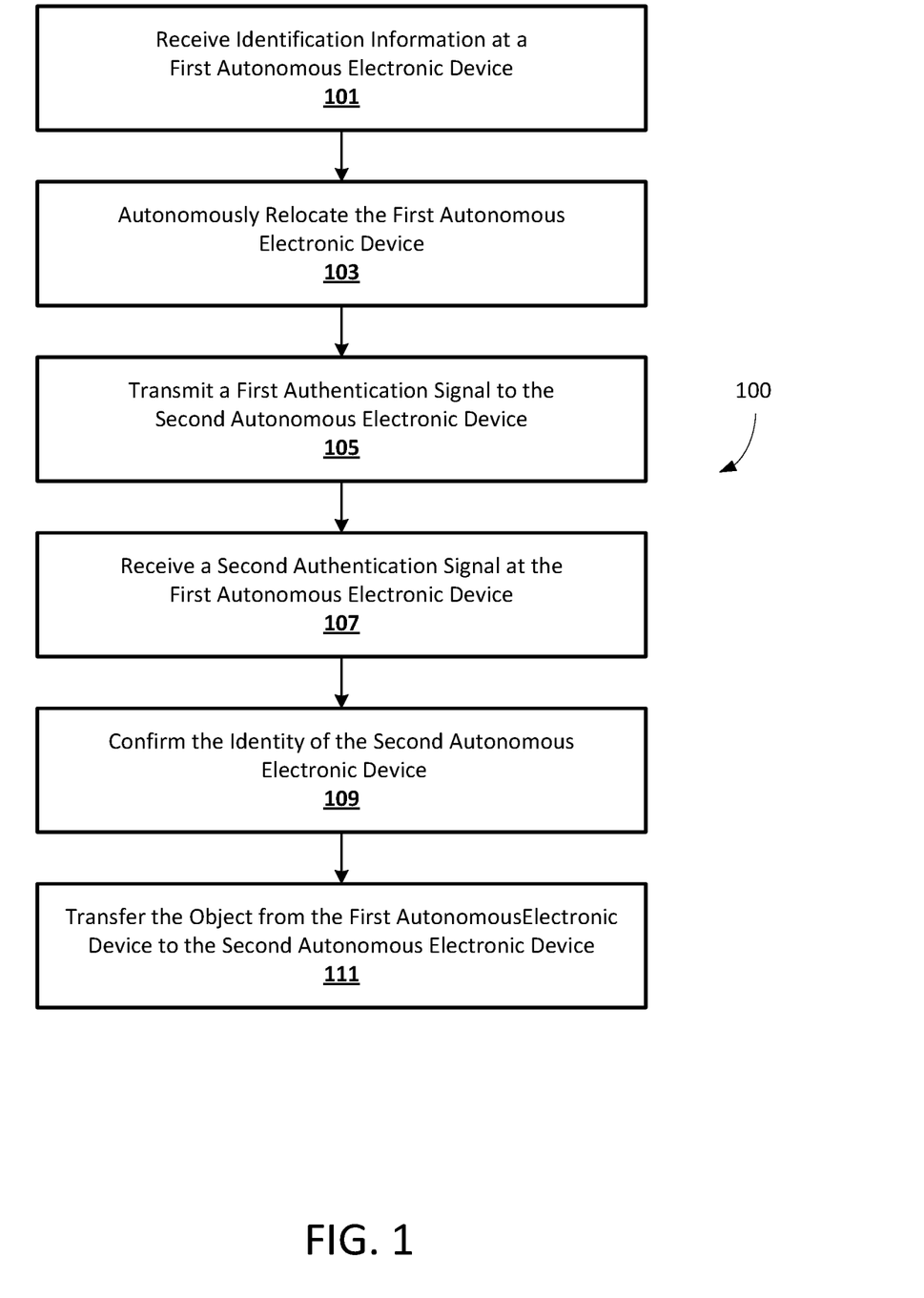
FIG. 1 is a flowchart illustrating an exemplary method for in-field authentication of autonomous electronic devices, according to an exemplary embodiment.

FIG. 1 is a flowchart illustrating an exemplary method 100 for in-field authentication of autonomous electronic devices, according to an exemplary embodiment. It will be appreciated that the method is programmatically performed, at least in part, by one or more computer-executable processes executing on, or in communication with one or more servers described further below. In step 101, a first mobile autonomous electronic device, configured to deliver an object to a specified location, receives a set of identification information associated with a second autonomous electronic device. For example, the first autonomous mobile electronic device can be configured to fly, drive, or other transport the object to the second autonomous electronic device. The second autonomous electronic device can be a mobile autonomous electronic device or a static autonomous electronic device. In exemplary embodiments, the first mobile autonomous electronic device is configured to wirelessly communicate with a second autonomous electronic device responsible for receiving the object at the specified location. In some embodiments, the set of identification information can include a unique audio signal, an infrared signal, an RFID code, an ultra-wideband signal, a Wi-Fi signal, a license number associated with the second autonomous electronic device, a barcode, a QR code, or visual characteristics of the second autonomous electronic device.

In step 103, the first mobile autonomous electronic device autonomously relocates to the specified location associated with the second mobile autonomous electronic device. In exemplary embodiments, the sender associated with the first mobile autonomous electronic device can monitor a status of the delivery and the geographical location of the first mobile autonomous electronic device. In alternative embodiments, the recipient associated with the second autonomous electronic device can monitor the status of the delivery and the geographical location of the first mobile autonomous electronic device.

In step 105, the first mobile autonomous electronic device transmits a first authentication signal to the signal to the second autonomous electronic device upon arrival at the specified location. In exemplary embodiments, the second autonomous electronic device is configured to confirm an identity of the first mobile autonomous electronic device based on the first authentication signal.

In step 107, the first mobile autonomous electronic device receives a second authentication signal from the second autonomous electronic device in response to transmission of the first authentication signal. In exemplary embodiments, the second authentication signal can confirm the identity of the second autonomous electronic device or confirm the identity of the recipient of the object being delivered by the first mobile autonomous electronic device.

In step 109, the first mobile autonomous electronic device confirms the identity of the second autonomous electronic device based on the second authentication signal. In exemplary embodiments, the first mobile autonomous electronic device requires at least two different types of identification information in order to confirm the identity of the second autonomous electronic device. For example, the identification information may include two or more of the following: a unique audio signal, an infrared signal, an RFID code, an ultra-wideband signal, a Wi-Fi signal, a license number associated with the second autonomous electronic device, a barcode, a QR code, or a visual characteristic of the second autonomous electronic device. In some embodiments, the different types of identification information required by the first mobile autonomous electronic device can be dynamically specified before the first mobile autonomous electronic device transmits the first authentication signal. The different types of identification information required can also be changed or dynamically updated while the first mobile autonomous electronic device is in transit in order to increase security for the delivery and/or can be randomly selected by the first mobile autonomous electronic device.

In step 111, the first mobile autonomous electronic device transfers the object to the second autonomous electronic device in response to confirming that the identity of the second autonomous electronic device corresponds to an expected identity and/or in response to the second autonomous electronic device confirming the identity of the first mobile autonomous electronic device. In exemplary embodiments, the expected identity of the second autonomous electronic device is included in the delivery information associated with the object. In this manner, two-way multi-level authentication of the first and second autonomous electronic devices can be achieved to ensure that each of the first and second autonomous electronic devices are secure and have not been compromised.

In exemplary embodiments, the first authentication signal can include a first blockchain key and the second authentication signal can include a second blockchain key. In such embodiments, the first and second blockchain keys can be configured to facilitate confirming the identity of the first mobile autonomous electronic device and the identity of the second autonomous electronic device. In some embodiments, the first mobile autonomous electronic device can access delivery information from a distributed blockchain database in response to confirming the identity of the second autonomous electronic device.

Figure 2:
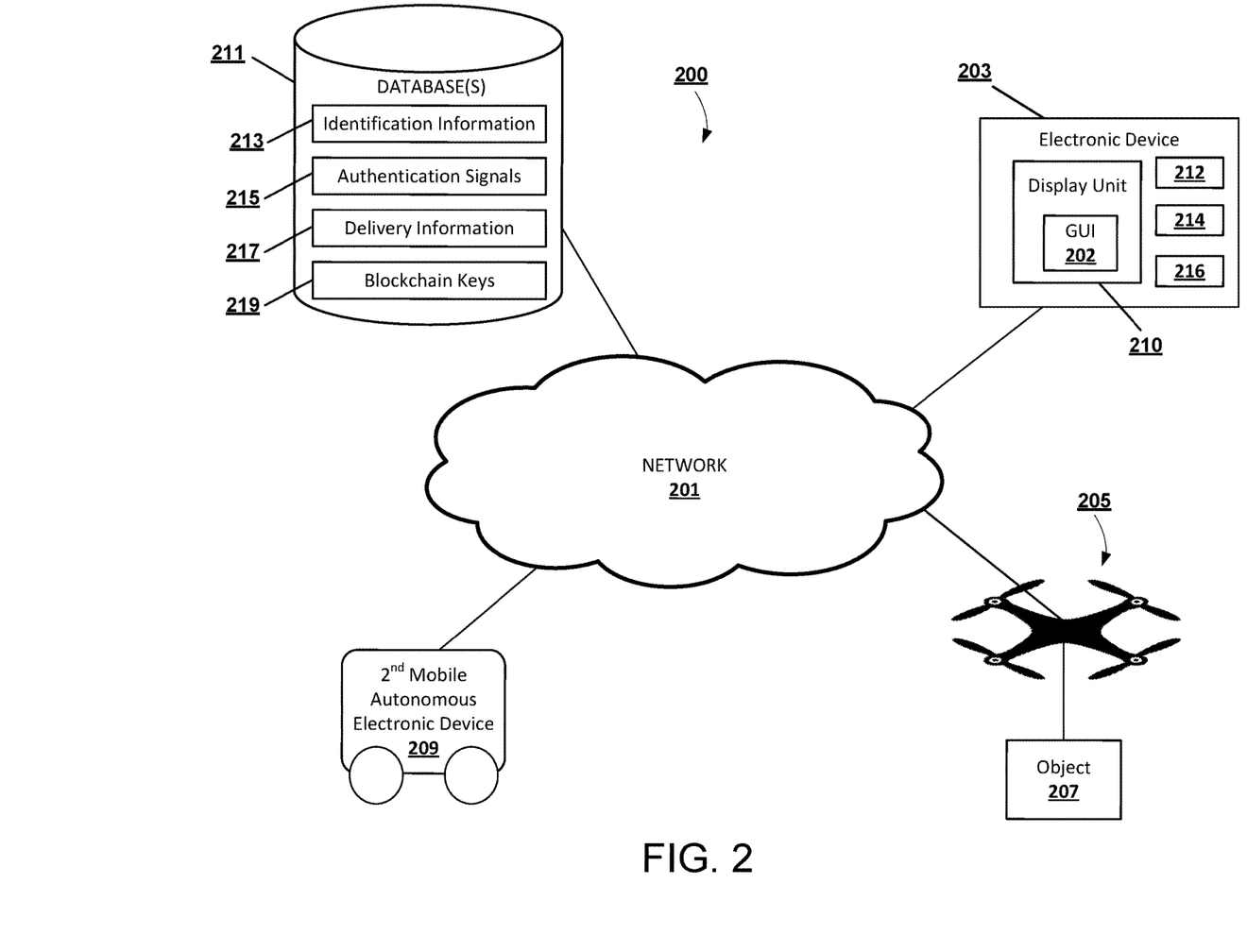
FIG. 2 is a diagram of an exemplary network environment suitable for a distributed implementation of an exemplary embodiment.

FIG. 2 illustrates a network diagram depicting a system 200 suitable for a distributed implementation of an exemplary embodiment. The system 200 can include a network 201, an computing device 203, a first mobile autonomous electronic device 205, a second autonomous electronic device 209, and a database 211. As will be appreciated, various distributed or centralized configurations may be implemented without departing from the scope of the present invention. In exemplary embodiments, the first mobile autonomous electronic device 205 can be configured to transport and deliver an object 207 to the second autonomous electronic device 209. The database 211 can store the identification information 213, authentication signals 215, delivery information 217, and blockchain keys 219, as discussed herein.

In exemplary embodiments, the computing device 203 may include a display unit 210, which can display a GUI 202 to a user of the computing device 203. The computing device 203 can also include a memory 212, processor 214, and a wireless interface 216. In some embodiments, the computing device 203 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, and the like. The computing device 203 may include some or all components described in relation to computing device 300 shown in FIG. 3. In exemplary embodiments, the recipient of the object can track the status of a deliver using the display unit 210 of the computing device 203.

The computing device 203 may connect to a network 201 via a wired or wireless connection. The computing device 203 can include one or more applications such as, but not limited to, a mobile application for scheduling deliveries, a web browser, a transaction application, an object reader application, a geo-location application, and the like.

In exemplary embodiments, the electronic device 203, first mobile autonomous electronic device 205, second autonomous electronic device 209, and database 211 may be in communication with each other via the communication network 201. The communication network 201 may include, but is not limited to, the Internet, an intranet, a LAN (Local Area Network), a WAN (Wide Area Network), a MAN (Metropolitan Area Network), a wireless network, an optical network, and the like. In one embodiment, the computing device 203, first mobile autonomous electronic device 205, second autonomous electronic device 209, and database 211 can transmit instructions to each other over the communication network 201. In exemplary embodiments, the identification information 213, authentication signals 215, delivery information 217, and blockchain keys 219 can be stored at the database 211 and received at the electronic device 203, the first mobile autonomous electronic device 205, or the second autonomous electronic device 209 in response to a service performed by a database retrieval application.

Figure 3:
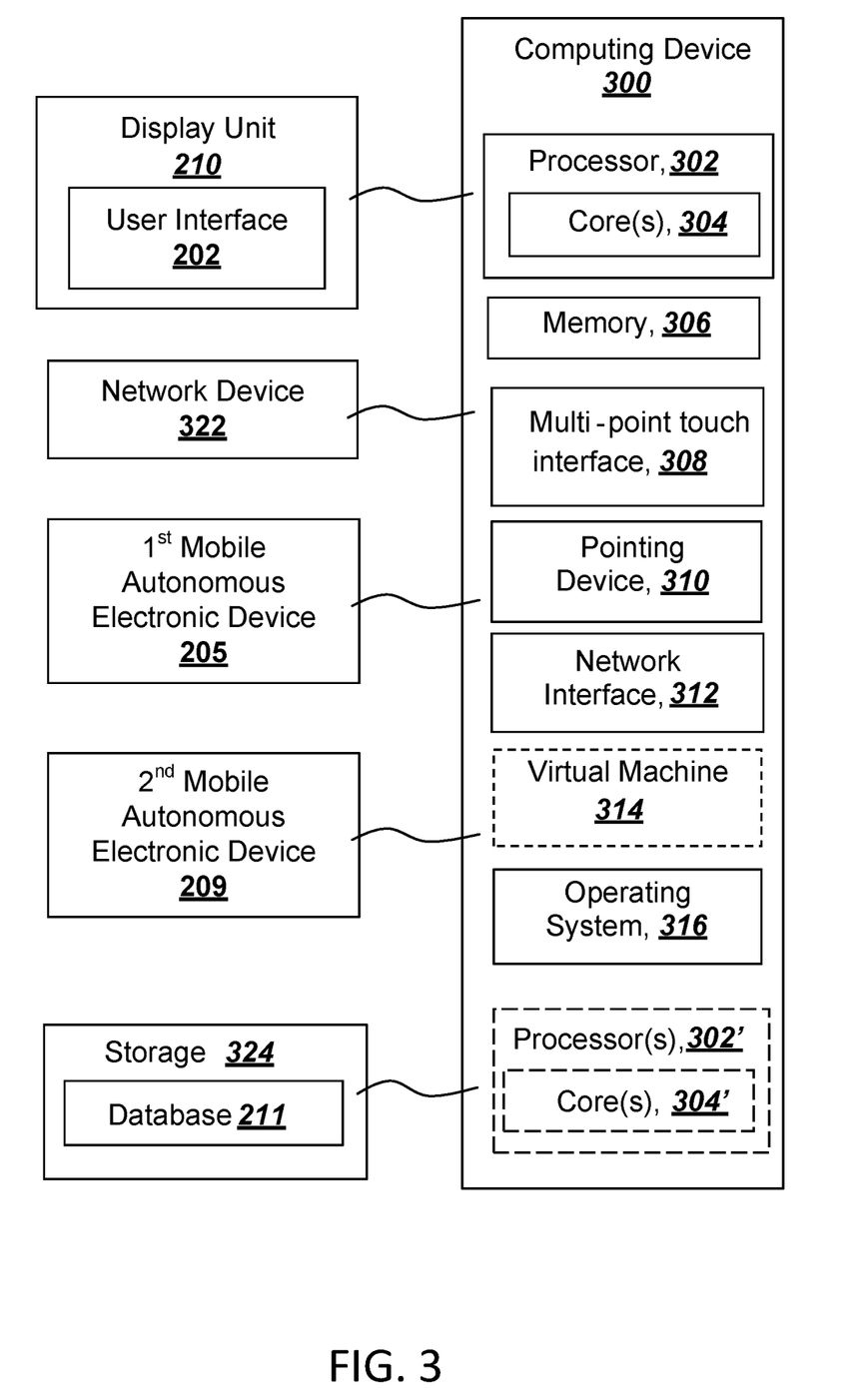
FIG. 3 is a block diagram of an exemplary computing device that can be used to perform exemplary processes in accordance with an exemplary embodiment.

FIG. 3 is a block diagram of an exemplary computing device 300 that can be used in the performance of the methods described herein. The computing device 300 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 306 included in the computing device 300 can store computer-readable and computer-executable instructions or software for implementing exemplary embodiments and programmed to perform processes described above in reference to FIG. 1. The computing device 300 also includes processor 302 and associated core 304, and optionally, one or more additional processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' can each be a single core processor or multiple core (304 and 304') processor.

Virtualization can be employed in the computing device 300 so that infrastructure and resources in the computing device can be shared dynamically. A virtual machine 314 can be provided to handle a process running on multiple processors so that the process appears to be using only one computing resource rather than multiple computing resources. Multiple virtual machines can also be used with one processor.

Memory 306 can be non-transitory computer-readable media including a computer system memory or random access memory, such as DRAM, SRAM, EDO RAM, and the like. Memory 306 can include other types of memory as well, or combinations thereof.

A user can interact with the computing device 300 through a display unit 210, such as a touch screen display or computer monitor, which can display one or more user interfaces 202 that can be provided in accordance with exemplary embodiments. The computing device 300 can also include other I/O devices for receiving input from a user, for example, a keyboard or any suitable multi-point touch interface 308, a pointing device 310 (e.g., a pen, stylus, mouse, or trackpad). The multi-point touch interface 308 and the pointing device 310 can be coupled to the display unit 210. The computing device 300 can include other suitable conventional I/O peripherals.

The computing device 300 can also include one or more storage devices 324, such as a hard-drive, CD-ROM, or other non-transitory computer readable media, for storing data and computer-readable instructions and/or software that can implement exemplary embodiments of the methods and systems as taught herein, or portions thereof. Exemplary storage device 324 can also store one or more databases 211 for storing any suitable information required to implement exemplary embodiments. The databases 211 can be updated by a user or automatically at any suitable time to add, delete, or update one or more items in the databases. Exemplary storage device 324 can store one or more databases 211 for storing the identification information 213, authentication signals 215, delivery information 217, blockchain keys 219, and any other data/information used to implement exemplary embodiments of the systems and methods described herein.

The computing device 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 312 can include a built-in network adapter, network interface card, PCMCIA network card, card bus network adapter, wireless network adapter, USB network adapter, modem or any other device suitable for interfacing the computing device 300 to any type of network capable of communication and performing the operations described herein. Moreover, the computing device 300 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 300 can run an operating system 316, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or other operating systems capable of running on the computing device and performing the operations described herein. In exemplary embodiments, the operating system 316 can be run in native mode or emulated mode. In an exemplary embodiment, the operating system 416 can be run on one or more cloud machine instances.

Descriptions of some embodiments of blockchain technology are provided with reference to FIGS. 4-9 herein. In some embodiments of described above, blockchain technology may be utilized to record authentication signals and identification information to facilitate or resulting from in-field authentication between autonomous electronic devices. One or more of the autonomous electronic devices described herein may comprise a node in a distributed blockchain system storing a copy of the blockchain record. Updates to the blockchain may comprise authentication signals or identification information, and one or more nodes on the system may be configured to incorporate one or more updates into blocks to add to the distributed database.

Distributed database and shared ledger database generally refer to methods of peer-to-peer record keeping and authentication in which records are kept at multiple nodes in the peer-to-peer network instead of being kept at a trusted party. A blockchain may generally refer to a distributed database that maintains a growing and ordered list or chain of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, e.g., resulting from in-field authentication of autonomous electronic devices, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it.

Figure 4:
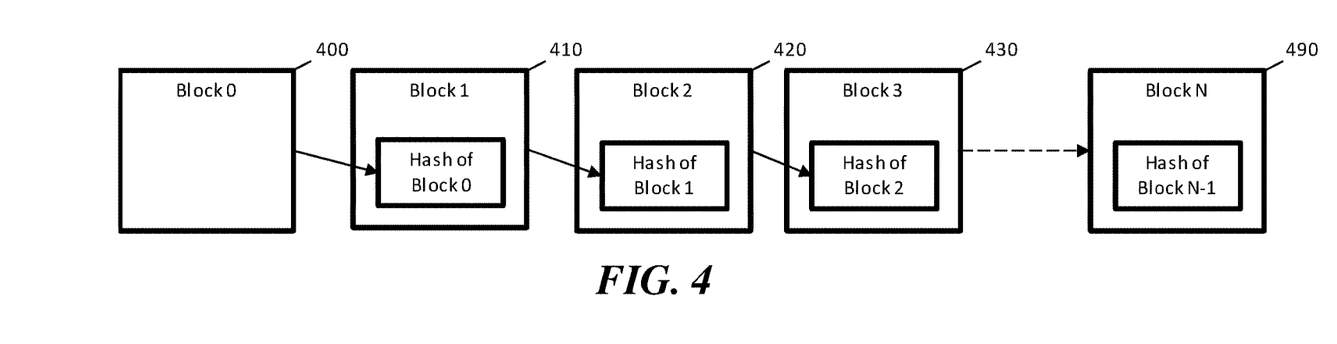
FIG. 4 comprises an illustration of blocks as configured in accordance with an exemplary embodiment.

Now referring to FIG. 4, an illustration of a blockchain according to some embodiments is shown. In some embodiments, a blockchain comprises a hash chain or a hash tree in which each block added in the chain contains a hash of the previous block. In FIG. 4, block 0 400 represents a genesis block of the chain. Block 1 410 contains a hash of block 0 400, block 2 420 contains a hash of block 1 410, block 3 430 contains a hash of block 2 420, and so forth. Continuing down the chain, block N contains a hash of block N−1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key associated with the first mobile autonomous electronic device that allows the first mobile autonomous electronic device to show possession and/or transfer the object using a private key. Nodes may verify that the first mobile autonomous electronic device is in possession of the object and/or is authorized to transfer the object based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. Nodes can compete to provide proof-of-work to form a new block, and the first successful node of a new block earns a reward.

Figure 5:
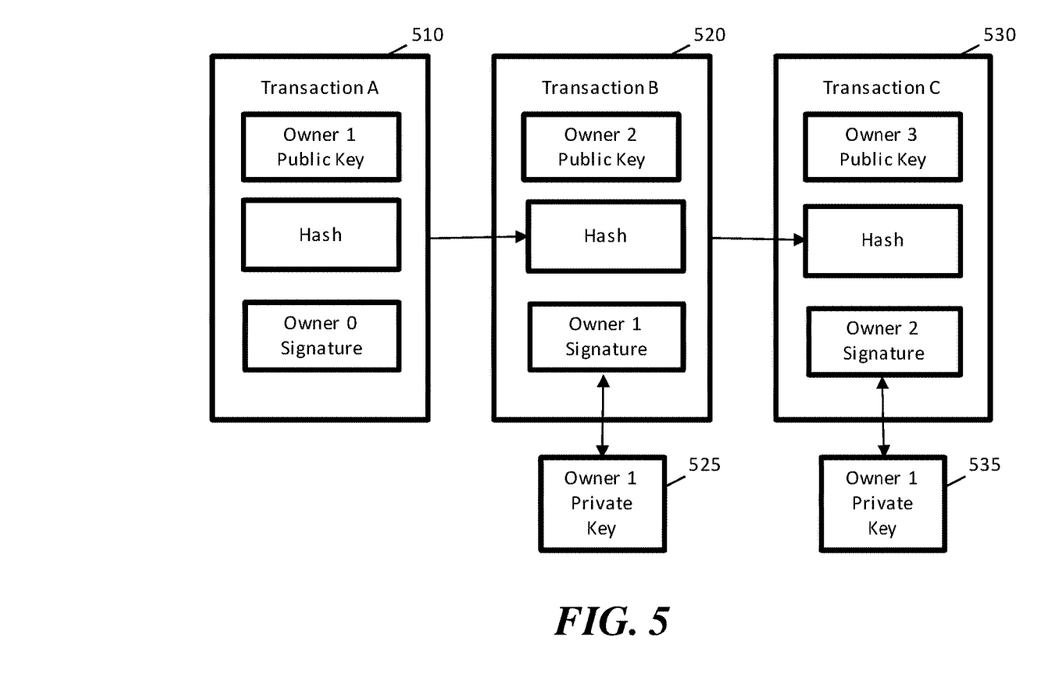
FIG. 5 comprises an illustration of transactions configured in accordance with an exemplary embodiment.

Now referring to FIG. 5, an illustration of blockchain based transactions according to some embodiments is shown. In some embodiments, the blockchain illustrated in FIG. 5 comprises a hash chain protected by private/public key encryption. Transaction A 510 represents a transaction recorded in a block of a blockchain showing that owner 1 (recipient) (e.g., the first mobile electronic device obtained an asset from owner 0. Transaction A 510 contains owner's 1 public key and owner 0's signature for the transaction and a hash of a previous block. When owner 1 (e.g., the first mobile autonomous electronic device) transfers the asset to owner 2 (e.g., the second autonomous electronic device), a block containing transaction B 520 is formed. The record of transaction B 520 comprises the public key of owner 2 (recipient), a hash of the previous block, and owner 1's signature for the transaction that is signed with the owner 1's private key 525 and verified using owner 1's public key in transaction A 510. If owner 2 (e.g., the second autonomous electronic device) transfers the asset to owner 3 (the end user), a block containing transaction C 530 is formed. The record of transaction C 530 comprises the public key of owner 3 (recipient), a hash of the previous block, and owner 2's signature for the transaction that is signed by owner 2's private key 535 and verified using owner 2's public key from transaction B 220. In some embodiments, when each transaction record is created, the system may check previous transaction records and the current owner's private and public key signature to determine whether the transaction is valid. In some embodiments, transactions are be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 5 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 6:
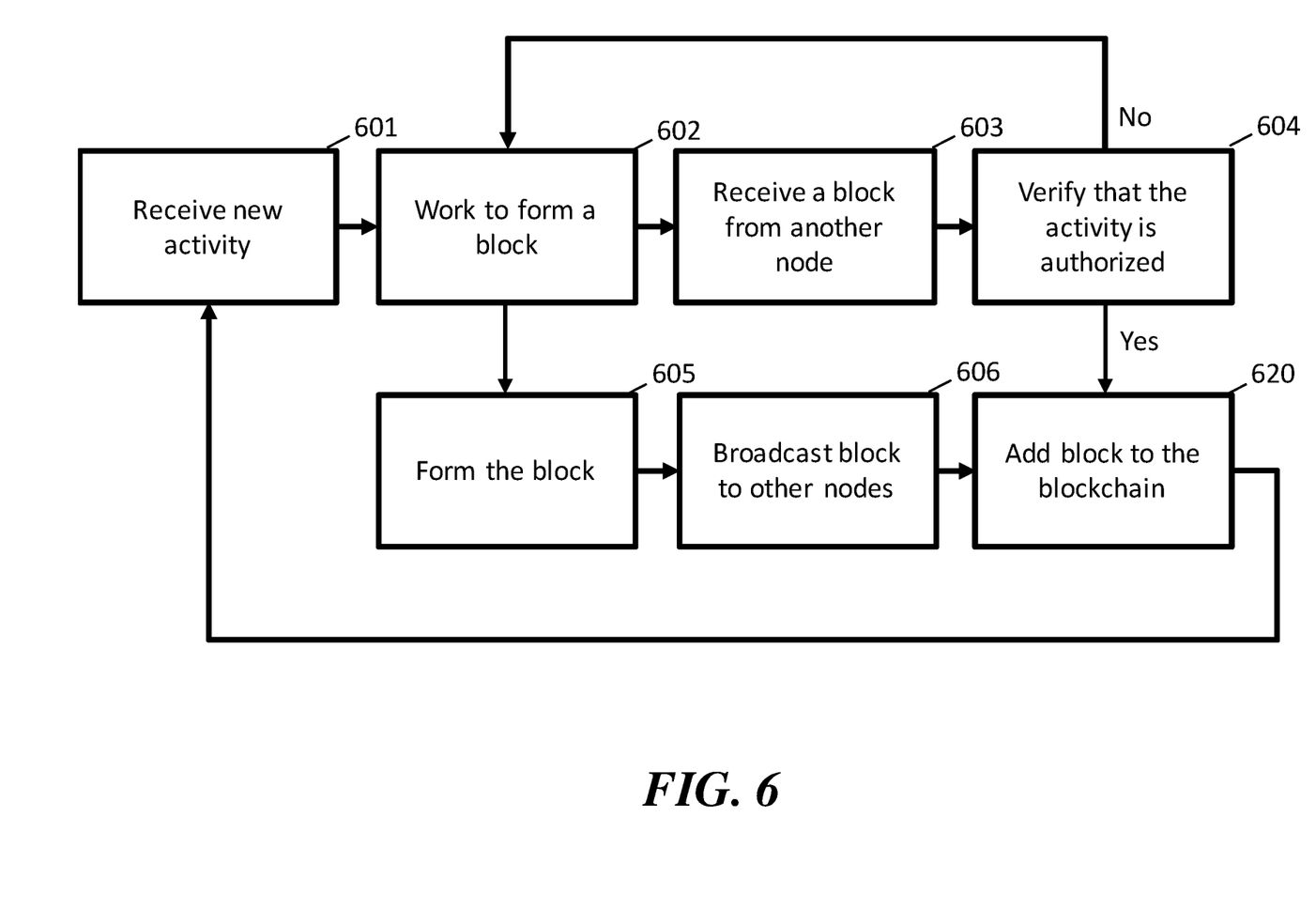
FIG. 6 comprises a flow diagram in accordance with an exemplary embodiment.

Now referring to FIG. 6, a flow diagram according to some embodiments is shown. In some embodiments, the steps shown in FIG. 6 may be performed by a processor-based device, such as a computer system, a server, a distributed server, a timestamp server, a blockchain node, and the like. In some embodiments, the steps in FIG. 6 may be performed by one or more of the nodes in a system using blockchain for record keeping.

In step 601, a node receives a new activity in response to in-field two-way multi-level authentication of the first and second autonomous electronic devices. The new activity may comprise an update to the record being kept in the form of a blockchain. In some embodiments, for blockchain supported digital or physical record keeping, the new activity can correspond to the authentication of the first and second autonomous electronic devices and/or the transfer of the object from the first mobile autonomous electronic device to the second autonomous electronic device. In some embodiments, the new activity may be broadcasted to a plurality of nodes on the network prior to step 601. In step 602, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 602, if the node successfully forms a block in step 605 prior to receiving a block from another node, the node broadcasts the block to other nodes over the network in step 606. In some embodiments, in a system with incentive features, the first node to form a block may be permitted to add reward to itself in the newly formed block. In step 620, the node then adds the block to its copy of the blockchain. In the event that the node receives a block formed by another node in step 603 prior to being able to form the block, the node works to verify that the activity (e.g., authentication of transfer) recorded in the received block is authorized in step 604. In some embodiments, the node may further check the new block against system consensus rules for blocks and activities to verify whether the block is properly formed. If the new block is not authorized, the node may reject the block update and return to step 602 to continue to work to form the block. If the new block is verified by the node, the node may express its approval by adding the received block to its copy of the blockchain in step 620. After a block is added, the node then returns to step 601 to form the next block using the newly extended blockchain for the hash in the new block.

In some embodiments, in the event one or more blocks having the same block number is received after step 620, the node may verify the later arriving blocks and temporarily store these block if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 601.

Figure 7:
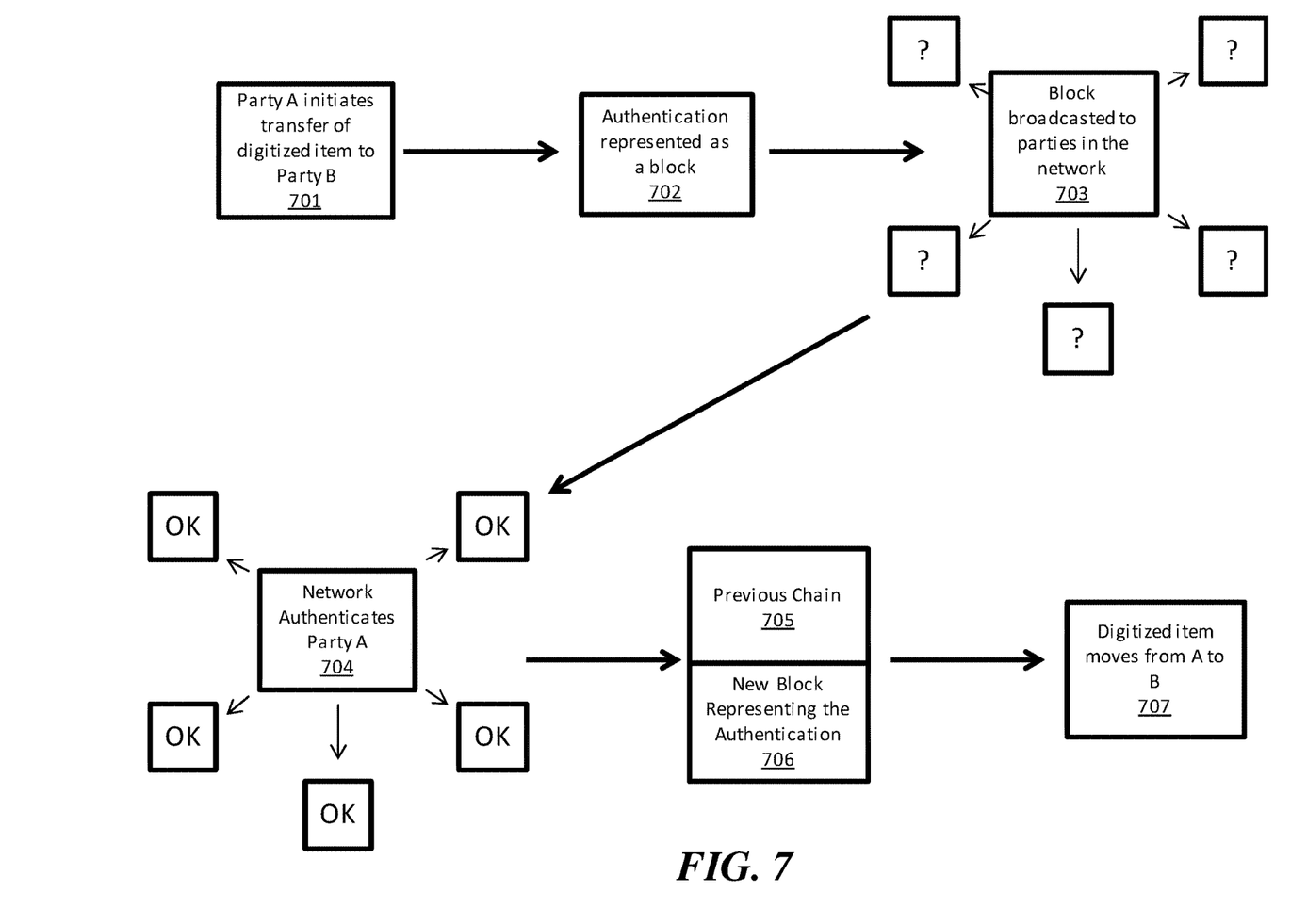
FIG. 7 comprises a process diagram as configured in accordance with an exemplary embodiment.

Now referring to FIG. 7, a process diagram a blockchain update according to some implementations in shown. In step 701, party A (the first mobile autonomous electronic device) initiates the delivery and transfer of an object to party B (the second autonomous electronic device). In some embodiments, Party A may be authenticated by signing the transaction with a private key that may be verified with a public key in the previous transaction associated with the object to be transferred. In step 702, the authentication initiated in step 701 is represented as a block. In some embodiments, the transaction may be compared with transaction records in the longest chain in the distributed system to verify part A's authentication. In some embodiments, a plurality of nodes in the network may compete to form the block containing the authentication record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. In step 703, the block is broadcasted to parties in the network. In step 704, nodes in the network authenticate party A by examining the block that contains the party A's authentication. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the object to be transferred). In some embodiments, a block may be approved with consensus of the nodes in the network. After a block is approved, the new block 706 representing the authentication is added to the existing chain 705 comprising blocks that chronologically precede the new block 706. The new block 706 may contain the transaction(s) and a hash of one or more blocks in the existing chain 705. In some embodiments, each node may then update their copy of the blockchain with the new block and continue to work on extending the chain with additional transactions. In step 707, when the chain is updated with the new block, the object can be transferred from party A to party B (e.g., from the first mobile autonomous electronic device to the second autonomous electronic device).

Figure 8:
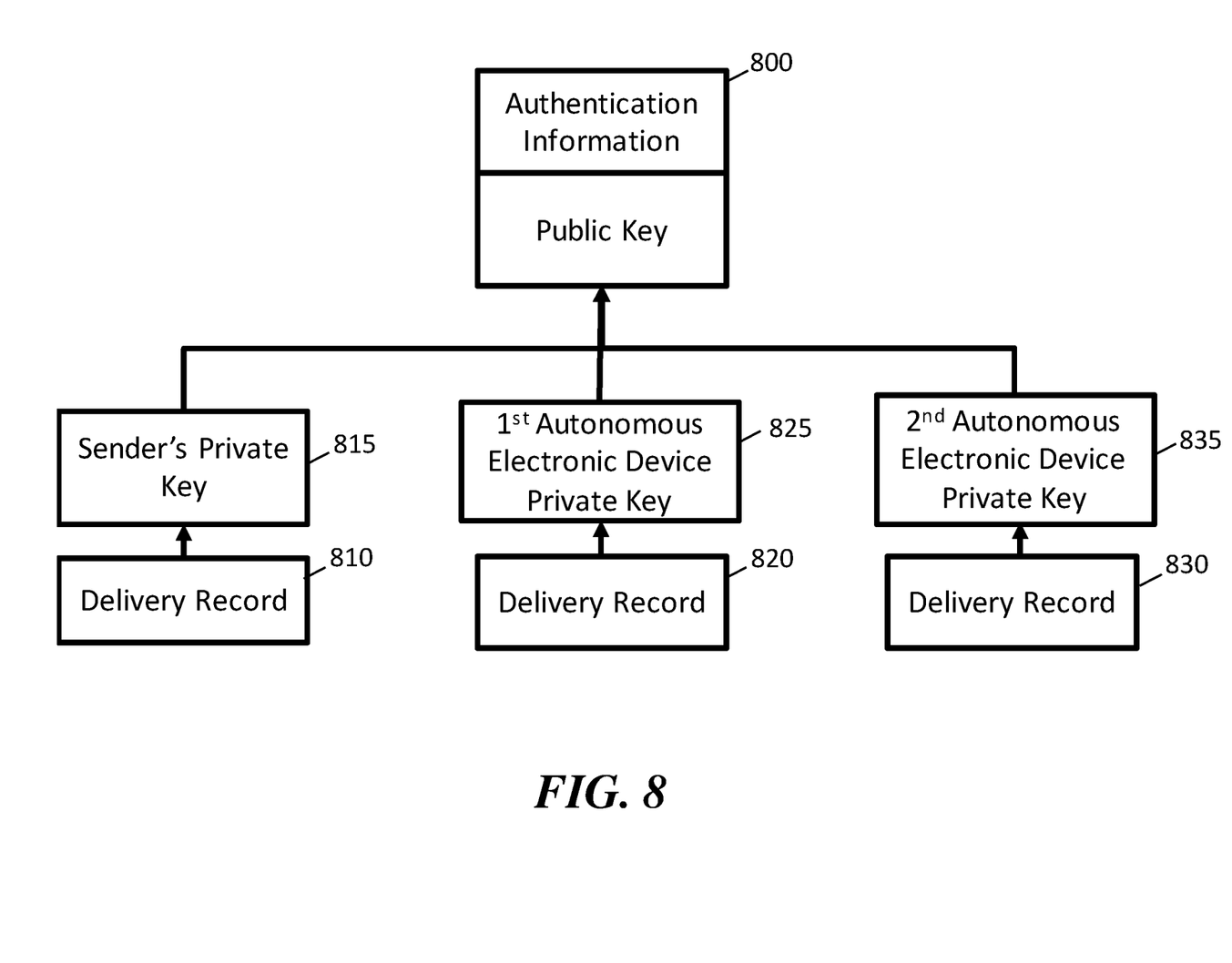
FIG. 8 comprises an illustration of a delivery record configured in accordance with an exemplary embodiment.

Now referring to FIG. 8, a diagram of a blockchain according to some embodiments in shown. FIG. 8 comprises an example of an implementation of a blockchain system for delivery service record keeping. The delivery record 800 comprises authentication information, transfer information, and a public key associated with one or more of the first mobile autonomous electronic device or the second autonomous electronic device. In some embodiments, nodes associated with the sender and first and second autonomous electronic devices may each store a copy of the delivery record 810, 820, and 830 respectively. In some embodiments, the delivery record 800 comprises a public key that allows the sender, first mobile autonomous electronic device, or the second autonomous electronic device to view and/or update the delivery record 800 using their private keys 815, 825, and the 835 respectively. For example, when an object is transferred from a sender to the first mobile autonomous electronic device, the sender may use the sender's private key 815 to authorize the transfer of a digital asset representing the physical asset from the sender to the first mobile autonomous electronic device and update the delivery record with the new transaction. In some embodiments, the transfer from the seller to the first mobile autonomous electronic device from both the sender and the from the first mobile autonomous electronic device using their respective private keys. The new transaction may be broadcasted and verified by the sender, the first mobile autonomous electronic device, and/or other nodes on the system before being added to the distributed delivery record blockchain. When the object is being transferred from the from the first mobile autonomous electronic device to the second autonomous electronic device, the first mobile autonomous electronic device may use the private key 825 to authorize the transfer of the digital asset representing the physical asset from the first mobile autonomous electronic device to the second autonomous electronic device and update the delivery record with the new transaction. In some embodiments, the transfer from the first mobile autonomous electronic device to the second autonomous electronic device can require that each of the autonomous electronic devices be authenticated, e.g., based on signatures from both the first mobile autonomous electronic device and the second autonomous electronic device using their respective private keys. The new transaction may be broadcasted and verified by the sender, the first mobile autonomous electronic device, the second autonomous electronic device, and/or other nodes on the system before being added to the distributed delivery record blockchain.

With the scheme shown in FIG. 8, the delivery record may be updated by one or more of the sender, the first mobile autonomous electronic device, and the second autonomous electronic device to form a record of the transaction without a trusted third party while preventing unauthorized modifications to the record. In some embodiments, the blockchain based transactions may further function to include transfers of digital currency with the completion of the transfer of the object from the first mobile autonomous electronic device to the second autonomous electronic device. With the distributed database and peer-to-peer verification of a blockchain system, the sender, the first mobile autonomous electronic device, and the second autonomous electronic device can confirm the authenticity and accuracy of the delivery record stored in the form of a blockchain.

Figure 9:
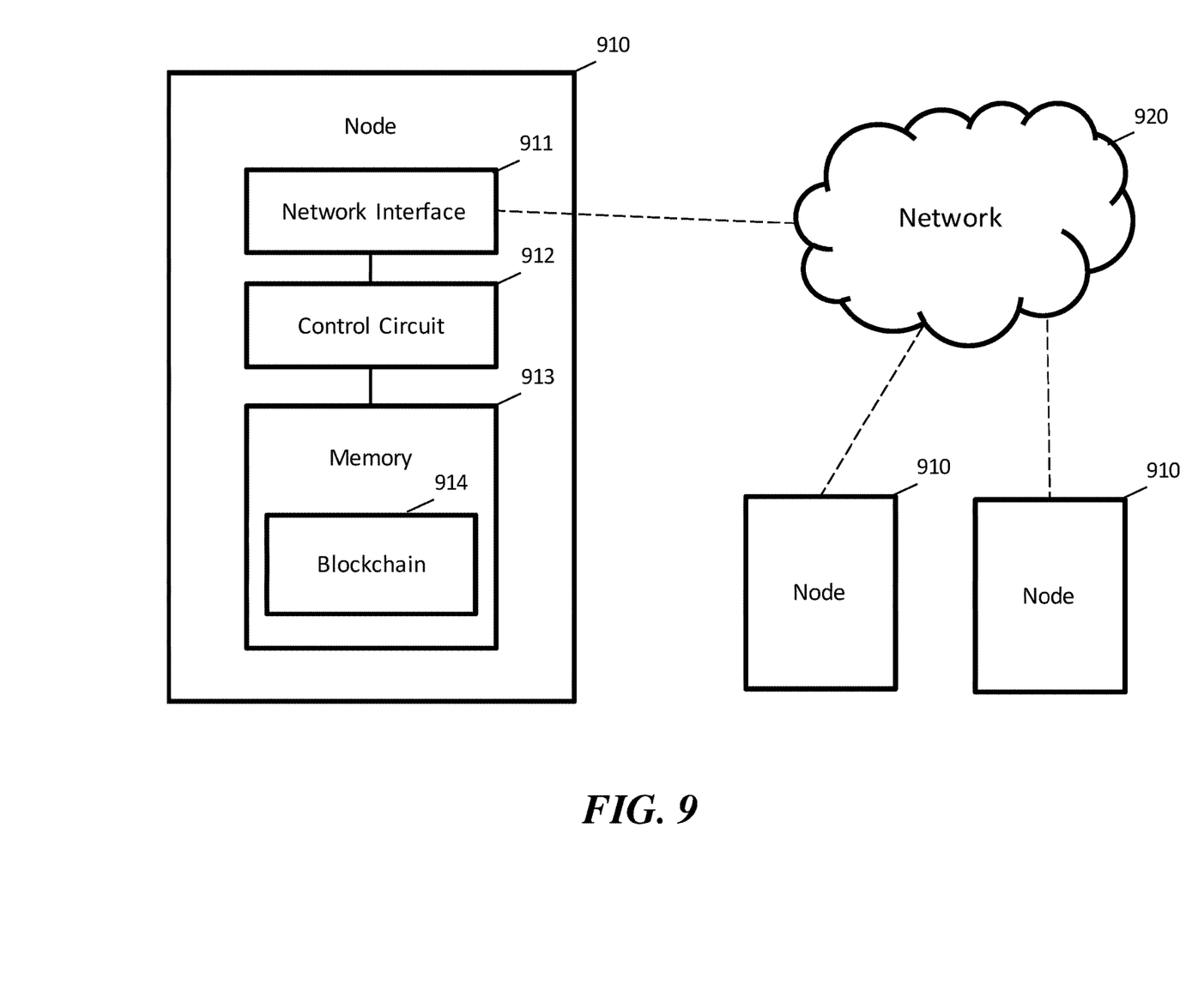
FIG. 9 comprise a system diagram configured in accordance with an exemplary embodiment.

Now referring to FIG. 9, a system according to some embodiments is shown. A distributed blockchain system comprises a plurality of nodes 910 communicating over a network 920. In some embodiments, the nodes 910 may be comprise a distributed blockchain server and/or a distributed timestamp server. Each node 910 in the system comprises a network interface 911, a control circuit 912, and a memory 913.

The control circuit 912 may comprise a processor, a microprocessor, and the like and may be configured to execute computer readable instructions stored on a computer readable storage memory 913. The computer readable storage memory may comprise volatile and/or non-volatile memory and have stored upon it a set of computer readable instructions which, when executed by the control circuit 912, causes the node 910 update the blockchain 914 stored in the memory 913 based on communications with other nodes 910 over the network 920. In some embodiments, the control circuit 912 may further be configured to extend the blockchain 914 by processing updates to form new blocks for the blockchain 914. Generally, each node may store a version of the blockchain 914, and together, may form a distributed database. In some embodiments, each node 910 may be configured to perform one or more steps described with reference to FIGS. 6-7 herein.

The network interface 911 may comprise one or more network devices configured to allow the control circuit to receive and transmit information via the network 920. In some embodiments, the network interface 911 may comprise one or more of a network adapter, a modem, a router, a data port, a transceiver, and the like. The network 920 may comprise a communication network configured to allow one or more nodes 910 to exchange data. In some embodiments, the network 920 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown in, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

Descriptions of embodiments of blockchain technology are provided herein as illustrations and examples only. The concepts of the blockchain system may be variously modified and adapted for different applications.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:
1. A system for in-field authentication of autonomous delivery drones, the system comprising:
a first mobile autonomous delivery drone configured to deliver an object to a specified location, the first mobile autonomous delivery drone being configured to wire- lessly communicate with a second mobile autonomous delivery drone responsible for receiving the object at the specified location, wherein the first mobile autonomous delivery drone is configured to:
receive a set of identification information associated with the second mobile autonomous delivery drone;
autonomously travel to the specified location;
dynamically select at least two different types of identification information from the set of identification information while
the first mobile autonomous delivery drone is in transit;
transmit a first authentication signal to the second mobile autonomous delivery drone upon arrival at the specified location, wherein the second mobile autonomous delivery drone is configured to confirm an identity of the first mobile autonomous delivery drone based on the first authentication signal;
receive the at least two different types of identification information from the second mobile autonomous delivery drone in response to transmission of the first authentication signal;
confirm an identity of the second mobile autonomous delivery drone based on the at least two different types of identification information; and
transfer the object to the second mobile autonomous delivery drone in response to confirming that the identity of the second mobile autonomous delivery drone corresponds to an expected identity.

2. The system of claim 1, wherein the set of identification information includes a unique audio signal, an RFID code, an ultra-wideband signal, a Wi-Fi signal, a license number associated with the second mobile autonomous delivery drone, a barcode, a QR code, or visual characteristics of the second mobile autonomous delivery drone.

3. The system of claim 1, wherein a sender associated with the first mobile autonomous delivery drone and a recipient associated with the second mobile autonomous delivery drone can monitor a status of the delivery.

4. The system of claim 1, wherein the first authentication signal transmitted by the first mobile autonomous delivery drone to the second mobile autonomous delivery drone includes a first blockchain key and the at least two different types of identification received by the first mobile autonomous delivery drone from the second mobile autonomous delivery drone includes a second blockchain key, the first and second blockchain keys used to confirm the identity of the first mobile autonomous delivery drone and the identity of the second mobile autonomous delivery drone.

5. The system of claim 4, wherein the first mobile autonomous delivery drone is configured to access delivery information from a distributed blockchain database in response to confirming the identity of the second mobile autonomous delivery drone.

6. A method for in-field authentication of mobile autonomous delivery drones comprising:
receiving, at a first mobile autonomous delivery drone configured to deliver an object, a set of identification information associated with a second mobile autonomous delivery drone;
autonomously relocating the first mobile autonomous delivery drone to a specified location associated with the second mobile autonomous delivery drone;
dynamically selecting, at the first mobile autonomous delivery drone, at least two different types of identification information from the set of identification information while the first mobile autonomous delivery drone is in transit;
transmitting a first authentication signal to the second mobile autonomous delivery drone upon arrival at the specified location, wherein the second mobile autonomous delivery drone is configured to confirm an identity of the first mobile autonomous delivery drone based on the first authentication signal;
receiving the at least two different types of identification information at the first mobile autonomous delivery drone from the second mobile autonomous delivery drone in response to transmission of the first authentication signal;
confirming an identity of the second mobile autonomous delivery drone based on the at least two different types of identification information selected from the set of identification information; and
transferring the object from the first mobile autonomous delivery drone to the second mobile autonomous delivery drone in response to confirming that the identity of the second mobile autonomous delivery drone corresponds to an expected identity.

7. The method of claim 6, wherein the set of identification information includes a unique audio signal, an RFID code, an ultra-wideband signal, a Wi-Fi signal, a license number associated with the second mobile autonomous delivery drone, a barcode, a QR code, or visual characteristics of the second mobile autonomous delivery drone.

8. The method of claim 6, wherein a sender associated with the first mobile autonomous delivery drone and a recipient associated with the second mobile autonomous delivery drone can monitor a status of the delivery.

9. The method of claim 6, wherein the first authentication signal includes a first blockchain key and the at least two different types of identification includes a second blockchain key, the first and second blockchain keys configured to facilitate confirming the identity of the first mobile autonomous delivery drone and the identity of the second mobile autonomous delivery drone.

10. The method of claim 6, further comprising:
accessing, using the first mobile autonomous delivery drone, delivery information from a distributed blockchain database in response to confirming the identity of the second mobile autonomous delivery drone.

11. A non-transitory machine readable medium storing instructions for in-field authentication of mobile autonomous delivery drones executable by a processing device, wherein execution of the instructions causes the processing device to:
receiving, at a first mobile autonomous delivery drone configured to deliver an object, a set of identification information associated with a second mobile autonomous delivery drone;
autonomously relocating the first mobile autonomous delivery drone to a specified location associated with the second mobile autonomous delivery drone;
dynamically selecting at least two different types of identification information from the set of identification information while the first mobile autonomous delivery drone is in transit;
transmitting a first authentication signal to the second mobile autonomous delivery drone upon arrival at the specified location, wherein the second mobile autonomous delivery drone is configured to confirm an identity of the first mobile autonomous delivery drone based on the first authentication signal;

receiving the at least two different types of identification information at the first mobile autonomous delivery drone from the second mobile autonomous delivery drone in response to transmission of the first authentication signal;

confirming an identity of the second mobile autonomous delivery drone based on the at least two different types of identification information selected from the set of identification information; and transferring the object from the first mobile autonomous delivery drone to the second mobile autonomous delivery drone in response to confirming that the identity of the second mobile autonomous delivery drone corresponds to an expected identity.

12. The non-transitory machine readable medium of claim 11, wherein the set of identification information includes a unique audio signal, an RFID code, an ultra-wideband signal, a Wi-Fi signal, a license number associated with the second mobile autonomous delivery drone, a barcode, a QR code, or visual characteristics of the second mobile autonomous delivery drone.

13. The non-transitory machine readable medium of claim 11, wherein the first authentication signal includes a first blockchain key and the at least two different types of identification includes a second blockchain key, the first and second blockchain keys configured to facilitate confirming the identity of the first mobile autonomous delivery drone and the identity of the second mobile autonomous delivery drone.

14. The non-transitory machine readable medium of claim 11, wherein execution of the instructions further causes the processing device to access delivery information from a distributed blockchain database in response to confirming the identity of the second mobile autonomous delivery drone.

* * * * *